United States Patent [19]

Benton

[11] 4,060,502
[45] Nov. 29, 1977

[54] SPONGE RUBBER RUG UNDERLAY HAVING IMPROVED LOAD BEARING CAPACITY

[75] Inventor: Richard E. Benton, Alliance, Ohio

[73] Assignee: The General Tire & Rubber Company, Akron, Ohio

[21] Appl. No.: 442,539

[22] Filed: Feb. 14, 1974

[51] Int. Cl.$^2$ ............................ C08J 9/10; C08K 5/01
[52] U.S. Cl. .......................... 260/2.5 P; 260/33.6 AQ; 260/759; 260/890
[58] Field of Search ............ 260/890, 2.5 L, 33.6 AQ, 260/759, 2.5 P

[56] References Cited

U.S. PATENT DOCUMENTS

| 2,713,040 | 7/1955 | Brass et al. | 260/890 |
| 3,689,355 | 9/1972 | Hornbaker et al. | 260/890 |

OTHER PUBLICATIONS

Condensed Chem. Dictionary, (5th Ed.), (Reinhold), (N.Y.), (1956), p. 885.
Sprague-Vanderbilt Rubber Handbook, (11th Ed.), (R. T. Vanderbilt), (N.Y.), (1968), pp. 520-523.

Primary Examiner—Donald E. Czaja
Assistant Examiner—H. H. Fletcher

[57] ABSTRACT

A composition is provided for use in flexible sponge rubber rug underlay of a type including about 100 parts of natural or synthetic rubber, from about 100 to about 300 parts of a reinforcing filler, and from about 50 to about 200 parts of oil. The improvement in the composition comprises from about 10 to about 40 parts of the natural or synthetic rubber being replaced by an approximately equal number of parts of a finely divided vinyl chloride polymer or copolymer. The present invention may also provide a sponge rubber of lower cost for the same apparent density.

7 Claims, No Drawings

SPONGE RUBBER RUG UNDERLAY HAVING IMPROVED LOAD BEARING CAPACITY

BACKGROUND OF THE DISCLOSURE

The present invention relates to a flexible polymeric sponge material, and more particularly, to a sponge rubber rug underlay compound having improved load bearing capacity.

Rub underlay is frequently made from a filled rubber, either natural or synthetic. The one most commonly used is styrene-butadiene rubber (SBR). SBR provides a durable, resilient, and flexible rug underlay when combined properly with various fillers, antioxidants, cure accelerators, and other compounding ingredients. Therefore, while the present invention may be used advantageously in any rubber rug underlay, it is especially useful with an SBR, and will be described in connection therewith. Conventionally, the filler material has been soft clay plus calcium carbonate, although it is also known to use calcium carbonate alone. A typical calcium carbonate is the one known commercially as Whiting. Other fillers which are used include alumina tri hydrate.

Among the properties for which any particular rug underlay composition is tested is its load bearing capacity; i.e., the amount by which the rug underlay will be compressed under a given load, or conversely, the force the underlay will exert, or the load it will support, when compressed by a given percentage. It should be readily apparent that for a composition which is to be used for rug underlay, the load bearing capacity is an especially important property of the composition.

SUMMARY OF THE INVENTION

Accordingly, it is an object of the present invention to provide a composition for use in flexible sponge rubber which enables the sponge to have an improved load bearing capacity.

It is another object of the present invention to provide an improved sponge rubber rug underlay having a reduced cost for the same apparent density.

These and other objects of the present invention, which will become apparent upon a reading of the following detailed description, are accomplished by the provision of a composition for use in flexible sponge rubber rug underlay, which typically includes about 100 parts of a natural or synthetic rubber, from about 100 to about 300 parts of a reinforcing filler, and from about 50 to about 200 parts of oil. The improvement in the composition comprises replacing from about 10 to about 40 parts of the natural or synthetic rubber with an approximately equal number of parts of a finely divided, vinyl chloride polymer or copolymer.

In accordance with another aspect of the present invention, the rubber is a styrene-butadiene rubber, and preferably, the molecular weight of the vinyl chloride polymer or copolymer is not less than about 30,000.

DESCRIPTION OF THE PREFERRED EMBODIMENTS

The following brief description of a typical process for producing rug underlay is included to help explain the present invention, and not for the purpose of limiting the same.

Normally, all of the ingredients of the compound are added during the first two process steps. First, most of the dry ingredients are mixed in a ribbon blender, and that mixture subsequently goes to a Banbury where it is combined with the rubber, some of the oil, and possibly several compounding ingredients.

From the Banbury, the compound may then pass through a series of mills such as a drop mill, breakdown mill, holding mill, and finally a feed mill, during which time the temperature of the compound may typically drop from about 180° F. to about 135° F. The stock may then pass through the calender where the temperature may drop an additional 15 or 20° F., after which the calendered compound passes under a steam jet, then through the curing oven. The platen temperature in the oven may typically be from about 400° to about 420° F., so that the underlay, as it leaves the oven is about 350° F. The underlay subsequently passes over a series of cooling rolls, after which the underlay is rolled and packaged, and the manufacturing process is completed.

It should be clearly understood that the present invention is no way dependent upon the particular process for making the underlay. Similarly, the present invention is in no way dependent upon or limited to a specific compound formulation, and the formulation of ingredients in the examples is presented merely as illustrative.

EXAMPLE 1

These examples are included to illustrate the improvement which occurs in the load bearing capacity of sponge rubber made from the composition of the present invention. Each of the samples (A through L) was made from a slightly different composition, all of which had the following group of ingredients ("constant ingredients") in common:

| Ingredient | Parts |
| --- | --- |
| Zinc Oxide | 5.0 |
| Stearic acid | 8.0 |
| Soft clay | 100.0 |
| CaCO$_3$ | 125.0 |
| Titanium dioxide | 9.0 |
| Celogen[1] | 1.5 |
| Soda | 3.0 |
| Altax[2] | 1.0 |
| Captax[3] | 2.4 |
| Thionex[4] | 1.4 |
| Sulfur | 4.0 |

The individual sample compositions were completed by adding to the above constant ingredients the following:

[1]Celogen OT - p,p' Oxybis - (benzene-sulfony/hydrazide) Uniroyal decomposes at 150-160° C - Nitrogen blowing agent.
[2]Altax - Benzothiazyl disulfide - R.T. Vanderbilt M.P. 159-170° C - Primary accelerator for rubbers.
[3]Captax - 2 - mercaptobenzothiazole - R.T. Vanderbilt Sp. Gr. 1.42-1.52, m.p. 164-176° C. General purpose rubber accelerator.
[4]Thionex - Tetramethylthiuram monosulfide E.I. duPont Sp. Gr. 1.39 m.p. 105-109° C Rubber accelerator..

| Comp. | SBR 1506 | Series 1 Vygen 50[5] | Vygen 3020[6] | Oil |
| --- | --- | --- | --- | --- |
| A | 100 | 0 | 0 | 100 |
| B | 80 | 20 | 0 | 95 |
| C | 70 | 30 | 0 | 90 |
| D | 60 | 40 | 0 | 90 |
| E | 80 | 0 | 20 | 90 |
| F | 70 | 0 | 30 | 90 |
| G | 60 | 0 | 40 | 90 |
| | | Series 2 | | |
| H | 100 | 0 | 0 | 90 |
| J | 80 | 20 | 0 | 90 |

-continued

| | | | | |
|---|---|---|---|---|
| K | 70 | 30 | 0 | 90 |
| L | 60 | 40 | 0 | 90 |

[5]Vygen® 50 is a very low molecular weight PVC homopolymer having inherent viscosity of 0.58 as determined by ASTM D-1755.
[6]Vygen® 220 is a low molecular weight co-polymer of 94% vinyl chloride and 6% vinyl acetate having inherent viscosity of 0.57 as determined by ASTM D-1755.

Samples made from compositions A through G (Series 1) were subjected to a compression set test in which a sample is compressed to 50% of its original thickness and held in that condition for 22 hours at 158° F. The compressive force is then released and a measurement is made of the amount of the 50% set which is permanent, i.e., if half of the initial set were retained permanently, the compression set would be 50%. Below are the results:

| Sample | Compression set |
|---|---|
| A | 53% |
| B | 53% |
| C | 67% |
| D | 53% |
| E | 57% |
| F | 49% |
| G | 40% |

Next, samples made from all of the compositions were given a compression-deflection test similar to ASTM test D-2406, but with no preflexing of the sample. For most of the compositions, 3 of the 8 × 8" samples were tested, while for H, K and L only one sample was tested. The readings are in pounds of force (with the reading in Newtons given in parentheses) and indicate the force exerted by the sample when it is compressed by 25%, compressed by 50%, and finally (for some of the samples), allowed to relax to where it was compressed by 25%.

| Sample | | Compression | | |
|---|---|---|---|---|
| | | 25% | 50% | 25% |
| A | 1 | 23.0 (102.1) | 46.0 (204.2) | 12.0 (53.2) |
| | 2 | 19.5 (86.5) | 46.0 (204.2) | 12.0 (53.2) |
| | 3 | 19.0 (84.3) | 45.0 (199.8) | 12.0 (53.2) |
| B | 1 | 26.0 (115.4) | 54.0 (239.7) | 13.0 (57.7) |
| | 2 | 22.0 (97.6) | 53.5 (237.5) | 13.0 (57.7) |
| | 3 | 22.0 (97.6) | 53.0 (235.3) | 13.0 (57.7) |

-continued

| Sample | | Compression | | |
|---|---|---|---|---|
| | | 25% | 50% | 25% |
| C | 1 | 34.0 (150.9) | 70.0 (310.8) | 16.0 (71.0) |
| | 2 | 27.0 (119.8) | 67.0 (297.4) | 16.0 (71.0) |
| | 3 | 26.0 (115.4) | 66.0 (293.0) | 16.0 (71.0) |
| D | 1 | 31.0 (137.6) | 65.0 (288.6) | 13.0 (57.7) |
| | 2 | 25.0 (111.0) | 63.0 (279.7) | 13.0 (57.7) |
| | 3 | 24.0 (106.5) | 62.0 (275.2) | 13.0 (57.7) |
| E | 1 | 33.0 (146.5) | 71.0 (315.2) | 15.0 (66.6) |
| | 2 | 26.0 (115.4) | 68.0 (301.9) | 15.0 (66.6) |
| | 3 | 26.0 (115.4) | 67.0 (297.4) | 15.0 (66.6) |
| F | 1 | 34.0 (150.9) | 73.0 (324.1) | 16.0 (71.0) |
| | 2 | 27.0 (119.8) | 71.0 (315.2) | 16.0 (71.0) |
| | 3 | 26.0 (115.4) | 68.0 (301.9) | 16.0 (71.0) |
| G | 1 | 38.0 (168.7) | 77.0 (341.8) | 16.0 (71.0) |
| | 2 | 30.0 (133.2) | 73.0 (324.1) | 16.0 (71.0) |
| | 3 | 29.0 (128.7) | 71.0 (315.2) | 16.0 (71.0) |
| H | 1 | 12.5 (55.5) | 30.0 (133.2) | |
| J | 1 | 15.5 (68.8) | 30.5 (135.4) | |
| | 2 | 16.0 (71.0) | 31.5 (139.8) | |
| | 3 | 15.0 (66.6) | 30.0 (133.2) | |
| K | 1 | 22.5 (99.9) | 43.0 (190.9) | |
| L | 1 | 19.0 (84.3) | 38.5 (170.9) | |

The effect of the substitution of the PVC for the SBR on the load bearing capacity can be clearly seen by noting the substantial increase in the force readings within samples A through G and again within samples H through L.

I claim:
1. A flexible sponge rubber comprising
   a. about 100 parts of a mixture consisting of rubber and from 10 to 40 parts of a resin selected from the group consisting of polyvinyl chloride and copolymers of chloride
   b. from about 100 to about 300 parts of a reinforcing filler and
   c. from about 50 to about 200 parts of oil.
2. The flexible sponge rubber of claim 1 wherein the molecular weight of said polyvinylchloride is from about 30,000 to about 60,000.
3. The flexible sponge rubber of claim 1 wherein the reinforcing filler is selected from the group consisting of soft clay, calcium carbonate and mixtures thereof.
4. The flexible sponge rubber of claim 1 wherein the rubber is a styrene-butadiene rubber.
5. The flexible sponge rubber of claim 1 wherein the resin is a homopolymer of vinyl chloride.
6. The flexible sponge rubber of claim 1 wherein the resin is a copolymer of vinylchloride.
7. The flexible sponge rubber of claim 1 wherein the resin is finely divided.

* * * * *

UNITED STATES PATENT AND TRADEMARK OFFICE
CERTIFICATE OF CORRECTION

PATENT NO. : 4,060,502
DATED : November 29, 1977
INVENTOR(S) : Richard E. Benton It is certified that error appears in the above-identified patent and that said Letters Patent are hereby corrected as shown below:

Column 4, line 31 which reads: "mers of chloride", should read --- mers of vinyl chloride ---.

Signed and Sealed this

Fourteenth Day of March 1978

[SEAL]

Attest:

RUTH C. MASON
*Attesting Officer*

LUTRELLE F. PARKER
*Acting Commissioner of Patents and Trademarks*